United States Patent
Bender et al.

(10) Patent No.: US 7,263,822 B2
(45) Date of Patent: Sep. 4, 2007

(54) CATALYTIC CONVERSION OF FUEL AND CONVERTER THEREFOR

(75) Inventors: Michael Bender, Ludwigshafen (DE); Signe Unverricht, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 219 days.

(21) Appl. No.: 10/021,346

(22) Filed: Dec. 19, 2001

(65) Prior Publication Data

US 2002/0083699 A1 Jul. 4, 2002

(30) Foreign Application Priority Data

Dec. 28, 2000 (DE) ................ 100 65 473

(51) Int. Cl.
*F01N 3/00* (2006.01)

(52) U.S. Cl. .................. 60/274; 60/286; 60/301; 60/303; 123/1 A; 123/538; 422/169; 422/172

(58) Field of Classification Search .............. 60/274, 60/286, 299, 300, 301, 303; 123/1 A, 3, 123/538; 422/168, 169, 171, 172, 177, 182
See application file for complete search history.

(56) References Cited

U.S. PATENT DOCUMENTS

| | | | | |
|---|---|---|---|---|
| 3,828,736 | A | * | 8/1974 | Koch ............... 123/3 |
| 3,855,980 | A | * | 12/1974 | Weisz et al. |
| 3,897,225 | A | * | 7/1975 | Henkel et al. ........... 48/127.7 |
| 3,954,423 | A | * | 5/1976 | Hamper et al. ......... 48/107 |
| 4,109,461 | A | * | 8/1978 | Fujitani et al. ........... 60/274 |
| 5,586,433 | A | * | 12/1996 | Boegner et al. ......... 60/274 |
| 6,138,454 | A | * | 10/2000 | Fournier et al. ......... 60/286 |
| 6,155,212 | A | * | 12/2000 | McAlister .............. 123/3 |
| 6,176,078 | B1 | * | 1/2001 | Balko et al. ........... 60/274 |
| 6,617,067 | B1 | * | 9/2003 | Tachihara et al. ........ 429/20 |
| 6,620,389 | B1 | * | 9/2003 | Lesieur .............. 422/220 |
| 6,833,126 | B2 | * | 12/2004 | Komaki et al. ........ 423/652 |
| 6,833,208 | B2 | * | 12/2004 | Kotani et al. ......... 429/20 |
| 6,981,865 | B2 | * | 1/2006 | Kobayashi ............ 431/7 |

FOREIGN PATENT DOCUMENTS

| | | |
|---|---|---|
| EP | 537 942 | 4/1993 |
| WO | 98/40153 | 9/1998 |

OTHER PUBLICATIONS

JP 10005546, Abstract.
JP 11244663, Abstract.

* cited by examiner

*Primary Examiner*—Binh Q. Tran
(74) *Attorney, Agent, or Firm*—Novak Druce & Quigg, LLP

(57) ABSTRACT

For a process for the catalytic conversion of furl for removing oxides of nitrogen from exhaust gases of internal combustion engines, in which fuel and a part-stream of the exhaust gas or of the intake air are converted in a converter, the fuel and the part-stream of the exhaust gas or of the intake air are fed separately from one another into the converter and the fuel is vaporized in the converter.

A converter for the catalytic conversion of fuel, comprising a vaporization space and a conversion space connected thereto is furthermore described, the vaporization space having separate feeds for exhaust gas or intake air and fuel, the conversion space having a catalyst for the catalytic conversion of fuel and the vaporization space and the conversion space being connected to one another so that heat transport from the conversion space into the vaporization space is possible.

16 Claims, 6 Drawing Sheets

CATALYTIC CONVERSION OF FUEL AND CONVERTER THEREFOR

The present invention relates to a process for the catalytic conversion of fuel, a process for removing oxides of nitrogen from exhaust gases of internal combustion engines and a converter suitable for this purpose.

BACKGROUND OF THE INVENTION

The technical development of directly injected gasoline and diesel engines operated with a lean mixture has led to a reduction in fuel consumption in recent years. As a result of this trend, the $CO_2$ emission from mobile sources can in future be permanently reduced without losses of power and mineral oil resources can be saved. The disadvantage of the operation of internal combustion engines using a lean mixture is however the formation of oxides of nitrogen ($NO_x$) owing to the large oxygen excess in the combustion chamber. Typically, the $NO_x$ concentrations in the engine exhaust gas are a few hundred ppm. The future European exhaust gas standards limit the amount of $NO_x$ emitted per kilometer driven to 0.5 g/km from Jan. 1, 2001 and to 0.25 g/km from Jan. 1, 2005. The use of directly injected engines using a lean mixture in car and truck traffic therefore requires efficient removal of oxides of nitrogen from the combustion exhaust gases.

Various possibilities are available for complying with the emission limits:

The technical measures relating to the engine include, for example, exhaust gas recycling to the engine (EGR). The $NO_x$ emission can be very efficiently reduced by this measure without losses of motor power since it results in a decrease in the oxygen content in the combustion chamber and hence suppression of the combustion of atmospheric nitrogen. The disadvantage of exhaust gas recycling is the simultaneous increase in the emission of soot particles. This state of affairs referred to as the diesel dilemma means that in practice it is not possible to comply with both limits—$NO_x$ as well as soot emission—by means of exhaust gas recycling alone. The effect of EGR apparatuses is partly improved by selective recycling of the oxides of nitrogen. The oxides of nitrogen are temporarily stored and are metered in concentrated form into the intake air of the engine. However, technical measures relating to the engine are not sufficient for achieving the required removal of oxides of nitrogen.

Improved removal of oxides of nitrogen from exhaust gas can be achieved in particular by exhaust gas catalysts in whose active materials the oxides of nitrogen are reacted with a reducing agent. Such catalyst systems rarely act through simple decomposition of the oxides of nitrogen into nitrogen. More frequently, fuel (diesel or gasoline fuel) is used as the reducing agent. The active materials used are as a rule based on noble metals which are applied to an oxidic support material and are arranged as a coating in a molding having a low pressure drop in the exhaust gas line of the vehicle (cf. for example WO 98/40153). In practice, a plurality of catalysts whose temperature ranges for the removal of oxides of nitrogen from the exhaust gas and for the oxidation of uncombusted exhaust gas components are each shifted relative to one another are used in such an exhaust gas system in the case of diesel vehicles. The broadened temperature window results in improved performance of the catalyst arrangement over the entire operating range (urban and nonurban). It is therefore necessary, particularly for diesel vehicles, to mount a catalytic converter close to the engine so that the heat contained in the exhaust gas can heat up the catalyst rapidly and directly and the catalyst rapidly reaches its active temperature.

WO 98/40153, too, describes such a system consisting of two catalysts based on noble metals. At conversions of $\geq 80\%$ of the hydrocarbon and $\geq 70\%$ of CO, an $NO_x$ degradation of 26% is achieved. However, the reaction in the exhaust gas of an engine operated with a lean mixture has the disadvantage that the reaction of $NO_x$ with the fuel used as a reducing agent competes with its combustion in the oxygen excess present. For this reason, only a small part is effectively used for reducing the amount of $NO_x$. The larger part of the fuel is lost without being used. The efficiency can be expressed chemically by the selectivity of the denox reaction. Frequently, the stoichiometric ratios of the denox reaction are neglected so that the selectivity data do not express the efficiency of the hydrocarbon directly. Thus, WO 98/40153 describes, for example, an $NO_x$ selectivity of from 0.3 to 1.0, which, when the stoichiometry is taken into account, would correspond to the use of from 1.5 to 5% of the available hydrocarbon propane for the denox reaction. The remaining hydrocarbon is directly combusted.

If these low efficiencies are applied to the $NO_x$ reduction with fuel, the theoretical amount of fuel to be used is so high that the fuel dose required for achieving the stipulated EURO IV exhaust gas standard overcompensates the advantageous consumption of the engine operated using a lean mixture. However, the fuel dose can be used neither economically nor technically in an expedient manner since the high heat of combustion of the fuel heats up the exhaust gas catalyst to such an extent that total combustion prevails. In any case, the competing total combustion of the reducing agent limits the $NO_x$ degradation so that the EURO IV standard cannot be achieved in this manner.

It is desirable to remove oxides of nitrogen reductively in the lean exhaust gas. Organic substances can be used as selective reducing agents for the catalytic removal of oxides of nitrogen from the exhaust gas of internal combustion engines. For example, in EP-A-0 537 942, the $NO_x$ reduction over highly acidic $\gamma$-$Al_2O_3$ with the aid of organic substances is described. The publication states that alkanes, alkenes, alkynes, aromatics, alcohols, aldehydes, ketones, ethers and esters can be used as such reducing agents. The publication furthermore describes the metering of these substances into the exhaust gas stream upstream of the $NO_x$ reduction catalyst via a nozzle. The nozzle physically atomizes, i.e. disperses, liquid or gaseous reactants. The $NO_x$ reduction with propylene as reducing agent is described in detail. The $NO_x$ degradation values of up to 80% are achieved only at temperatures above 500° C. This fact is disadvantageous since the temperature of the exhaust gas, in particular of diesel engines, is 100-400° C. and hence substantially below the $NO_x$ degradation temperature described in EP-A-0 537 942.

The reducing agents can be provided either by carrying in a separate tank or by on-board production from a precursor. The latter variant has advantages since the vehicle fuel can be used as the precursor so that there is also no need for an expensive on-board infrastructure for carrying the precursor. Thus, JP-A-112 44663 describes a process in which the hydrocarbon-containing exhaust gas is passed first over a partial oxidation catalyst and then over the actual $NO_x$ reduction catalyst. The partial oxidation catalysts described are titanium oxides which have been doped with various transition metals. Noble metal-containing active materials are used for the actual $NO_x$ reduction. The disadvantage of this process is the fact that the temperature of the partial oxidation catalyst is not constant since said catalyst is alternatively heated and cooled by the temperature of the exhaust gas stream. The temperature of the catalyst system and hence the denox performance thus depends on the operating point of the engine.

JP-A-100 005 46 describes a similar process. Here too, the hydrocarbon used for the $NO_x$ reduction is partially oxidized beforehand. For this purpose, at least a part of the exhaust gas or a separate air stream is mixed with hydrocarbon and an oxygen-containing, organic substance and this mixture is oxidized to aldehydes in an oxidation unit. The residence time of the gas stream in the oxidation reactor is set at 0.05-1 second. The aldehydes are passed into the main exhaust gas stream and reacted with the oxides of nitrogen contained therein over an $NO_x$ reduction catalyst. The active materials consist of various transition metals (Ag, Co, Ni) supported on $\gamma$-$Al_2O_3$. The disadvantage of these systems is that they exhibit $NO_x$ degradation only at temperatures above 350° C. It is true that the $NO_x$ degradation temperature can be reduced considerably by using Pt/Ce as dopant. However, the optimum temperature for operating the oxidation unit is still very high at 500° C. Engine components suffer as a result of the considerable heat radiation of the oxidation unit, and the autothermal operation of this oxidation unit is not possible. Such a converter must be externally heated.

It is an object of the present invention to provide a process for the catalytic conversion of fuel and for removing oxides of nitrogen from exhaust gases of internal combustion engines, which process avoids the disadvantages of the existing processes.

BRIEF SUMMARY OF THE INVENTION

We have found that this object is achieved, according to the invention, by a process for the catalytic conversion of fuel for removing oxides of nitrogen from exhaust gases of internal combustion engines, in which fuel and a part-stream of the exhaust gas or of the intake air are converted in a converter, wherein the fuel and the part-stream of the exhaust gas or of the intake air are fed separately from one another into the converter and the fuel is vaporized in the converter.

The term fuel describes all conventional fuels, such as gasoline and diesel fuels, and other corresponding mineral oil distillates. In particular, diesel fuel is understood by this term.

The term internal combustion engine relates in general to engines which are driven by combustion of fuel. In particular it relates to gasoline or diesel engines, particularly diesel engines, especially engines operated using a lean mixture.

In the converter, the fuel is converted. The conversion may comprise cracking, dehydrogenation or partial oxidation. Preferably, the fuel is dehydrogenated or partially oxidized, especially partially oxidized. The fuel is preferably at least partially oxidized to carboxylic acids and/or carboxylic anhydrides. In particular, the fuel is at least partially oxidized to maleic acid and/or maleic anhydride. The reaction preferably leads very substantially to maleic acid or maleic anhydride.

However, the converter product stream may also contain carbon monoxide or hydrogen or a mixture of the two gases.

We have found that this object is also achieved, according to the invention, by a process for removing oxides of nitrogen from exhaust gases of internal combustion engines, wherein first a process as described above for the catalytic conversion of fuel is carried out, and the product stream from the converter is combined with the exhaust gas of the internal combustion engine and is reacted over a catalyst for the degradation of the oxides of nitrogen.

In particular, maleic acid or maleic anhydride is reacted with the oxides of nitrogen ($NO_x$), the oxides of nitrogen being reduced and the maleic anhydride or the maleic acid being oxidized.

The reaction for the degradation of the oxides of nitrogen is preferably carried out over a catalyst whose active material does not promote the total oxidation of maleic anhydride. The active material of the catalyst therefore contains no Cr, Mn, Fe, Co, Ni, Ru, Rh, Pd, Ir, Pt or Cu. The catalyst for the degradation of the oxides of nitrogen thus has no combustion activity, in contrast to the noble metal-containing catalysts usually used.

The catalyst for the degradation of the oxides of nitrogen preferably contains at least one oxide of a metal of the first to fourth main group of the Periodic Table of the Elements, in particular of aluminum. Especially, the catalyst contains $\gamma$-$Al_2O_3$. It may also consist of $\gamma$-$Al_2O_3$.

The catalyst does not promote total combustion of organic substances in the temperature window of from 100 to 600° C., preferably from 150 to 500° C., in particular from 200 to 400° C.

The catalyst may contain tin oxide in an amount of from 0 to 70, preferably from 0 to 50, in particular from 0 to 30, % by weight (based on the total weight of the catalyst).

The catalyst may have a monolithic honeycomb shape, preferably in the form of an extruded and subsequently calcined active material.

The product stream obtained after the reaction over the catalyst for the degradation of the oxides of nitrogen may additionally be further reacted over a noble metal-containing catalyst for the oxidation of remaining organic compounds.

In comparison with known processes, according to the invention the reaction of oxides of nitrogen with hydrocarbons is separated into two steps. First, the fuel (hydrocarbons) is oxidized to maleic acid (anhydride) and, in a subsequent step, the oxides of nitrogen and maleic acid (anhydride) are reacted over $\gamma$-$Al_2O_3$ to give nitrogen and preferably carbon dioxide. The formation of maleic acid (anhydride) can be carried out under steady-state conditions which are optimally chosen (temperature, space velocity, etc.) so that a maximum maleic acid (anhydride) yield is possible. Only then is the product mixed with the exhaust gas, whose composition differs depending on the operation of the engine, and further reacted. This makes it possible to carry out the removal of oxides of nitrogen, in particular in engines operated using a lean mixture, cheaply and with high yields.

The present invention also relates to a converter for the catalytic conversion of fuel, comprising a vaporization space and a conversion space connected thereto, the vaporization space having separate feeds for exhaust gas or intake air and fuel, the conversion space having a catalyst for the catalytic conversion of fuel and the vaporization space and the conversion space being connected to one another so that heat transport from the conversion space into the vaporization space is possible.

The converter can be used in the process described above.

The preferred embodiments which follow illustrate the invention:

BRIEF DESCRIPTION OF THE DRAWINGS

In the attached drawing.

The reference numerals have the following meanings:
1 Diesel engine block
2 Exhaust gas high pressure side (exhaust manifold)
3 Exhaust gas turbocharger
4 Intake air high pressure side (intake manifold)
5 Charge cooler
6 Clutch and gear
7 Exhaust gas catalytic converter close to engine (end wall)
8 Exhaust gas line
9 Underfloor catalytic converter
10 Fuel tank
11 Low-pressure injection pump
12 High-pressure injection pump
13 Fuel injection nozzles with reservoir pipe
14 Catalytic fuel converter
15 Temperature sensor on the fuel converter
16 Controlled throttle valve for the exhaust gas part-stream (FIG. 2) or intake air part-stream (FIG. 3)
17 Pressure sensor on the high-pressure side of the exhaust gas stream or intake air stream
18 Electronic engine control unit
19 Second controlled throttle valve for exhaust gas part-stream or intake air part-stream
20 Second pressure sensor on the high-pressure side of the exhaust gas stream or intake air stream
21 Supply of liquid fuel
22 Fuel injection nozzle
23 Partial oxidation catalyst
24 Partial gas stream
25 Deflecting cap
26 Gas exit from the partial oxidation catalyst

DETAILED DESCRIPTION OF THE DRAWINGS

The catalysts for partial reaction and denox reaction were tested in a laboratory apparatus. For this purpose, the active materials in chip form (0.7-1.0 mm) were initially taken in a reactor and externally heated in an oven. To do this, the oven was controlled linearly from 200° C. to 400° C. The gas loading was 20 000 $h^{-1}$. The synthetic exhaust gas was premixed with a residual $O_2$ content of 10% and a water content of 5%.

The partial oxidation was effected with vaporization of the fuel over an externally heated bed of steatite beads. The yield of maleic anhydride was determined in the gas phase with the aid of an IR spectrometer.

In the experiments for removing oxides of nitrogen from exhaust gas, the catalytic $NO_x$ degradation in the cooling phase of the tests was determined with the aid of a chemi-luminescence $NO_x$ detector. The partial oxidation of diesel to maleic anhydride showed a maximum at 400° C. with a yield of about 30%.

Figure 1:
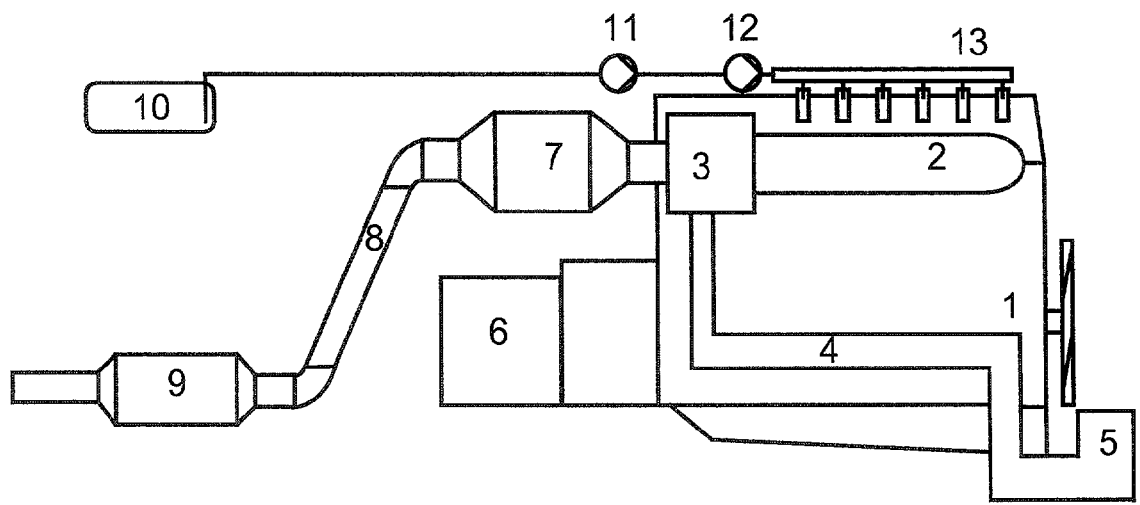
FIGS. 1 to 4 show the schematic structure of the internal combustion engine with exhaust gas treatment and FIG. 5 shows the schematic structure of the converter.

The present invention relates in particular to the improvement of the removal of oxides of nitrogen from the exhaust gas of a directly injected (DI) diesel engine (FIG. 1). In this modern engine type, the engine (1) is equipped with an exhaust gas turbocharger (3) which is operated by the exhaust gas stream (2) and compresses fresh air (4) via a charge cooler (5) into the combustion chamber of the engine. The engine is supplied with fuel by an injection system which transports the fuel from a tank (10) via a low-pressure stage (11) and a high-pressure stage (12) into the system of injection nozzles (13). As an alternative to this injection system, a system of a plurality of combinations of pump and nozzle in pairs is also known. Each individual cylinder is supplied with fuel by such a pair. After being let down downstream of the turbocharger, the exhaust gas of the diesel engine passes into an underfloor catalytic converter (7) close to the engine and via a tail pipe (8) further into an underfloor catalytic converter (9) and then via the exhaust pipe into the atmosphere. A system has been developed in the present invention for removing oxides of nitrogen from the exhaust gas of such an engine and is installed in addition to these engine components and makes use of the engine components present. One of the advantages of such modular equipment is obvious: existing vehicles can be retrofitted with such a system and their emission behavior can thus be substantially improved subsequently.

According to the invention, the vehicle is preferably operated using three catalysts. First, the diesel fuel provided for the $NO_x$ reduction is partially oxidized to maleic anhydride (MAA) in a converter. The MAA-containing product stream is combined with the main exhaust gas stream, and the oxides of nitrogen are reacted with MAA over a denox catalyst to give nitrogen, carbon dioxide and water. MAA residues are oxidized with excess oxygen in a third noble metal-containing catalyst to give $CO_2$ and $H_2O$.

Figure 2:
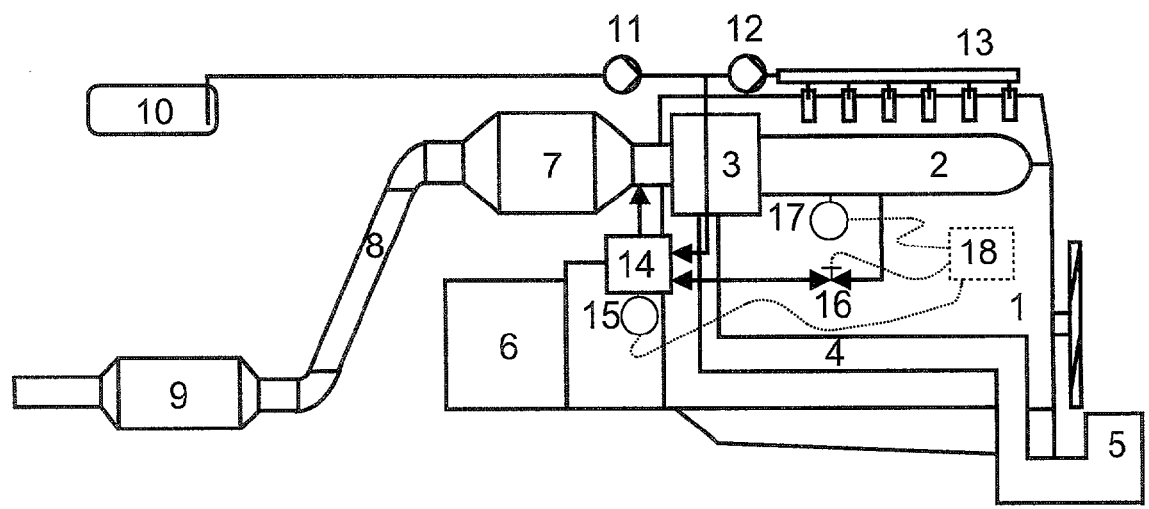
Figure 3:
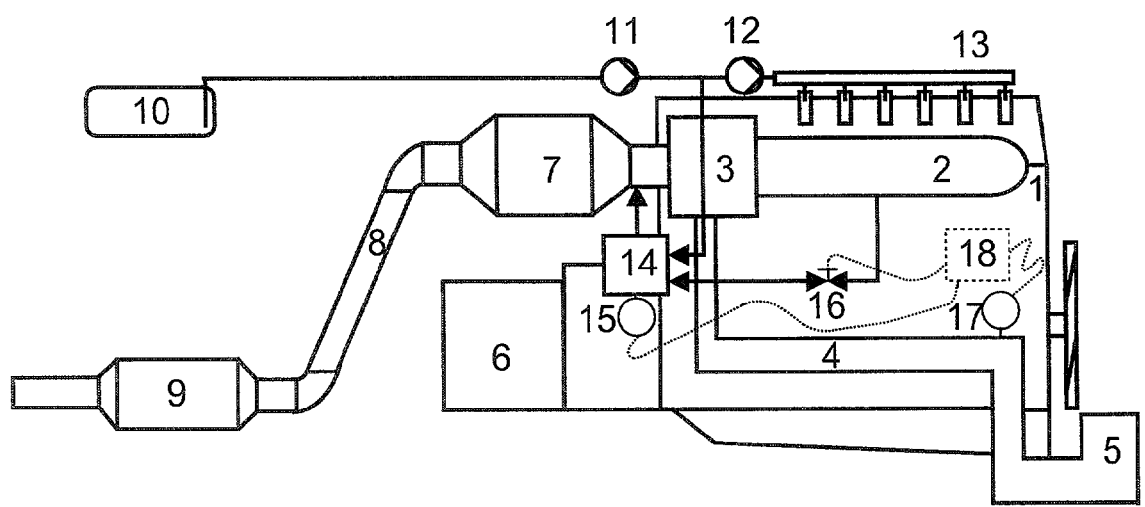
Figure 4:
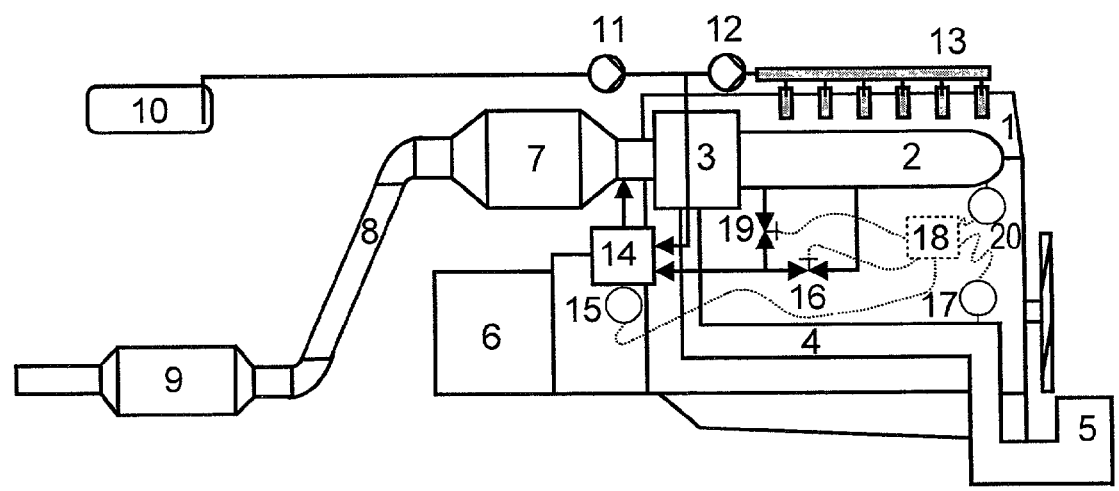

The technical implementation is preferably effected by controlled throttling of the exhaust gas stream (FIG. 2) or of the intake air stream (FIG. 3) or of a controllable mixture of the two gases (FIG. 4) into a converter (FIGS. 2-4: 14). In any case, this partial gas stream is oxygen-containing and is used for partial oxidation of the fuel.

The control of the gas stream by the throttle valves (16, 20) is effected by means of the engine electronics (18) with the aid of the relevant gas pressure (17, 21) as a measured variable. The amount of the partial gas stream fed in is such that the concentration of diesel fuel in the gas phase in the interior of the converter is constant. An indirect criterion for this is the converter temperature (15) which, in the case of complete conversion of the diesel to MAA, is obtained from the heat of reaction and the heat capacity of the partial gas stream. The converter temperature is kept constant at 400° C. At this temperature, the yield of MAA is maximum. Furthermore, the thermal load of the environment in the engine space is substantially reduced with respect to comparable converters.

Figure 5:
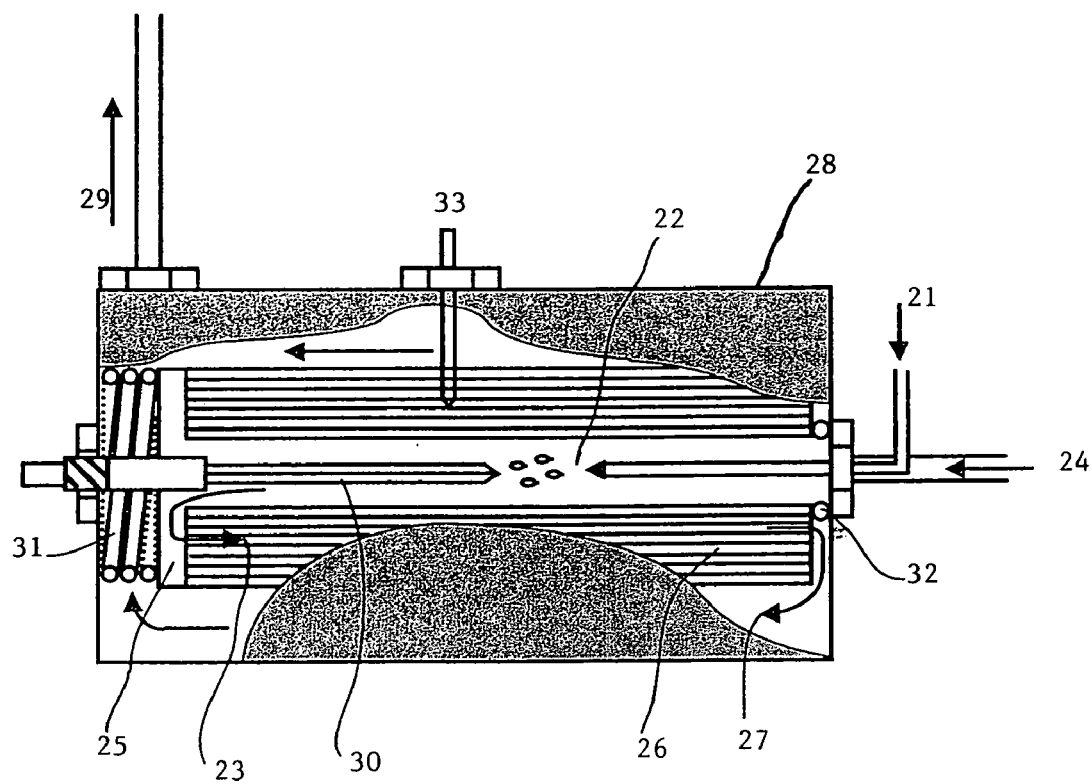

The structure of the converter is shown in FIG. 5. Diesel fuel is withdrawn from the engine's own fuel injection system via a bypass line (FIG. 2-4: 19), preferably on its low-pressure side, and is metered in liquid form into an evaporator pipe in the converter (FIG. 5, 21-22). The evaporator pipe consists of a cylindrical recess in the interior of a catalytic converter for the partial oxidation of the fuel 23, which catalytic converter is preferably designed as a honeycomb element. By transfer of the heat of reaction from this catalytic converter into the evaporator pipe, the partial gas stream 24 introduced in parallel. The advantage of the addition in the converter is the vaporization of the fuel with the aid of the heat of reaction of the partial oxidation. This makes it possible to achieve a substantially more homogeneous distribution of the fuel in the partial gas stream than in the case of the addition before the converter, and hence an optimized yield of oxidation product. At the end of the evaporator pipe, the fuel-containing gas stream is deflected by a mounted cap 25 into the outer part of the catalytic converter 23. At this point the fuel is partially oxidized with the aid of suitable active materials to give oxidation products, preferably to give carboxylic acids or their anhydrides, particularly preferably to give MAA or maleic acid. At the opposite exit 26, the gas stream is deflected again and passes into the volume 27 between converter housing 28 and catalytic converter. From there, it is passed into the exhaust gas line of the vehicle 29. Opposite the injection nozzle, a heating element 30, preferably a glow plug, is arranged in the evaporator pipe. The heating element is supplied by the on-board power supply of the vehicle, as a rule an automobile battery, and serves for initiating the partial oxidation when the vehicle is started: on the one hand, the active material is heated to the required operating temperature so that autothermal operation is possible. On the other hand, the heating element initially serves for vaporizing the injected fuel. Arranged around the inlet nozzle of the heating element is a spring 31 with the aid of which the arrangement comprising catalytic converter and deflecting cap is pressed against a seal 32 in order to ensure that the gas streams travel in the manner described above. For constant control of the converter temperature, the ratio of gas stream and metered amount of fuel is kept constant. The converter temperature is measured by a thermocouple 33 which is inserted into the interior of the partial oxidation catalyst. Said converter temperature is obtained physically from the ratio of the virtually constant heat capacity of the partial gas stream and the likewise constant heat of reaction. If their ratio is constant, the temperature in the interior of the converter is also constant. At a converter temperature of 400° C. and with complete conversion of the diesel fuel, a maximum yield of MAA is achieved. At this temperature, the heat load of adjacent components of the engine is substantially reduced compared with operation at higher temperatures. Expensive shielding of the converter can therefore be dispensed with.

The MAA-containing product stream of the converter is combined, upstream of the catalytic converter close to the engine, with the main exhaust gas stream and passes together with this via the catalytic converter close to the engine. In conventional systems, this catalyst contains noble metal-based or transition metal-based active materials. The relevant catalysts are produced by applying an oxidic wash coat to ceramic or metallic honeycomb elements by slip coating, followed by drying and calcination and subsequent impregnation with noble metal or transition metal salt, followed in turn by drying and calcination.

Such expensive catalyst systems can be dispensed with in the case of the catalytic converter close to the engine and intended for the novel denox process described here. Instead, a honeycomb element on which a wash coat of $\gamma$-$Al_2O_3$ is applied by slip coating and subsequent drying and calcination is preferably used. It is even advantageous to use a solid honeycomb extruded from $\gamma$-$Al_2O_3$, so that the number of production steps is further reduced. $\gamma$-$Al_2O_3$ is adequate as active material for the efficient reduction of $NO_x$ with MAA. Downstream of the catalytic converter close to the engine is a noble metal-containing underfloor catalyst as already used in conventional systems. This catalyst oxidizes CO and volatile organic components, which would otherwise enter the environment, to $CO_2$ and $H_2O$.

Figure 6:
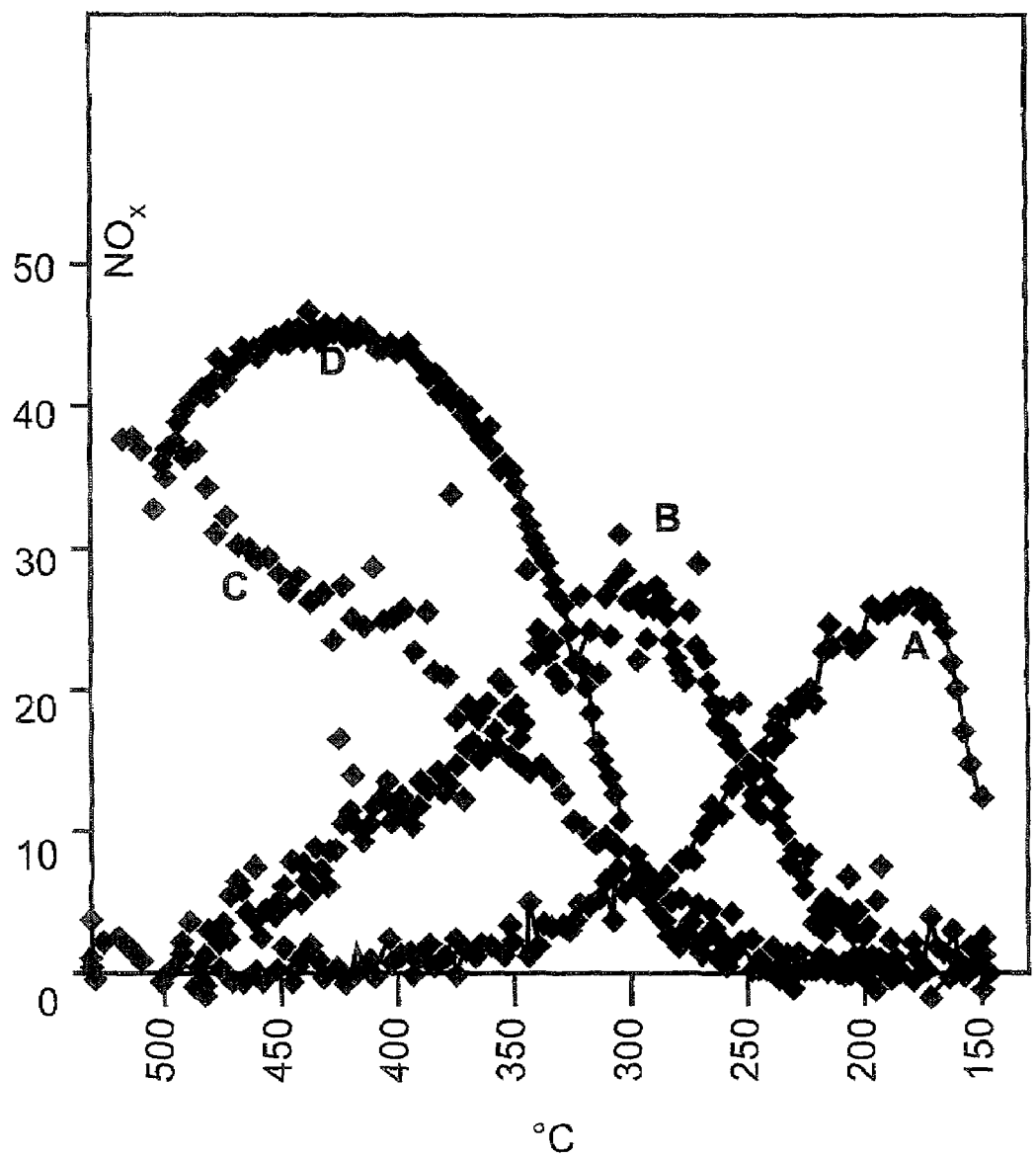
FIG. 6 shows a plot of the $NO_x$ degradation in % against the oven temperature in ° C. for four different reactions:
A: Diesel over $Pt/Al_2O_3$
B: Diesel over 20% $CuO:\gamma-Al_2O_3$
C: Diesel over $\gamma-Al_2O_3$
D: Maleic anhydride over $\gamma-Al_2O_3$

FIG. 6 compares the $NO_x$ degradation with diesel over two conventional denox catalysts based on platinum- or copper-doped $\gamma$-$Al_2O_3$ (A, B) with a degradation with diesel over $\gamma$-$Al_2O_3$ (C) and a degradation with MAA over $Al_2O_3$ (D). The test conditions were chosen to be standard, with a gas loading of 20 000 h$^{-1}$, an $NO_x$ concentration of 1 000 ppm and four times the carbon atom equivalents as reducing agent. In the temperature range of 200-400° C. (FIG. 7, shaded area) relevant for the removal of oxides of nitrogen from diesel exhaust gas, the two systems stated exhibit $NO_x$ degradation which however declines owing to poor activity at low temperatures and poor selectivity at high temperatures. The maximum $NO_x$ degradation of 25-30% is comparatively low and is not sufficient for complying with future emission limits.

Substantially higher $NO_x$ degradation values are achieved by using $\gamma$-$Al_2O_3$ (C) inactive with respect to combustion. With diesel fuel, degradation values of up to 40% can be achieved here. However, high reaction temperatures of up to 500° C. are required for this purpose, in order to be able to catalytically activate the diesel fuel. For this reason, the $NO_x$ degradation in the relevant temperature window is only below 25%. As a result of the partial oxidation of the diesel fuel to MAA, upstream of the $NO_x$ reduction over $\gamma$-$Al_2O_3$, this degradation value improves to 47% at as low as 400° C. (D). It is thus substantially above the values found over platinum- or copper-doped catalysts at 200-400° C.

We claim:

1. A process for a catalytic conversion of fuel for removing oxides of nitrogen from exhaust gases of internal combustion engines, in which fuel and a part-stream of the exhaust gas or of an intake air are converted in a converter, wherein the fuel and the part-stream of the exhaust gas or of the intake air are fed separately from one another into the converter and the fuel is vaporized in the converter, wherein the fuel is at least partially oxidized to carboxylic acids and/or carboxylic anhydrides.

2. A process as claimed in claim 1, wherein the fuel and the part-stream of the exhaust gas or of an intake air, which have been converted in the converter, are combined with the exhaust gas of the internal combustion engine and are reacted over a catalyst in order to remove oxides of nitrogen from exhaust gases of internal combustion engines by their degradation.

3. The process as claimed in claim 2, wherein the reaction for the degradation of the oxides of nitrogen is carried out over the catalyst whose active material contains no Cr, Mn, Fe, Ni, Ru, Rh, Pd, Ir, Pt or Cu.

4. The process as claimed in claim 3, wherein the catalyst for the degradation of the oxides of nitrogen contains at least one oxide of a metal of the first to fourth main group of the Periodic Table of the Elements.

5. The process as claimed in claim 4, wherein the catalyst for the degradation of the oxides of nitrogen contains $\gamma$-$Al_2O_3$.

6. The process as claimed in claim 2, wherein the product stream obtained after the reaction over the catalyst for the degradation of the oxides of nitrogen is further reacted over a noble metal-containing catalyst for an oxidation of the remaining organic compounds.

7. A converter for a catalytic conversion of fuel, comprising a vaporization space and a conversion space the vaporization space being located within the conversion space, the vaporization space having separate feeds for exhaust gas or intake air and liquid fuel, the conversion space having a catalyst for the catalytic conversion of liquid fuel by the partial oxidation thereof, and the vaporization space and the conversion space being connected to one another so that heat transport from the conversion space into the vaporization space is possible to vaporize the liquid fuel with the aid of the heat of reaction of the partial oxidation, wherein the catalyst is used in the form of a honeycomb.

8. A process for a catalytic conversion of fuel for removing oxides of nitrogen from exhaust gases of internal combustion engines by reducing oxides of nitrogen with carboxylic acids and/or anhydrides, which are oxidation products of the fuel, in which fuel and a part-stream of the exhaust gas are converted in a converter, wherein the liquid fuel and the part-stream of the exhaust gas are fed separately from one another into the converter and the liquid fuel is vaporized in the converter.

9. The process as claimed in claim 8, wherein the fuel is dehydrated or partially oxidized.

10. The process as claimed in claim 8, wherein the fuel is at least partially oxidized to carboxylic acids and/or carboxylic anhydrides.

11. A process as claimed in claim 10, wherein the fuel and the part-stream of the exhaust gas, which have been converted in the converter, are combined with the exhaust gas of the internal combustion engine and are reacted over a catalyst in order to remove oxides of nitrogen from exhaust gases of internal combustion engines by their degradation.

12. The process as claimed in claim 11, wherein the reaction for the degradation of the oxides of nitrogen is carried out over the catalyst whose active material contains no Cr, Mn, Fe, Co, Ni, Ru, Rh, Pd, Ir, Pt or Cu.

13. The process as claimed in claim 12, wherein the catalyst for the degradation of the oxides of nitrogen contains at least one oxide of a metal of the first to fourth main group of the Periodic Table of the Elements.

14. The process as claimed in claim 13, wherein the catalyst for the degradation of the oxides of nitrogen contains $\gamma$-$Al_2O_3$.

15. The process as claimed in claim 11, wherein the product stream obtained after the reaction over the catalyst for the degradation of the oxides of nitrogen is further reacted over a noble metal-containing catalyst for an oxidation of the remaining organic compounds.

16. A converter for the catalytic conversion of fuel for removing oxides of nitrogen from exhaust gases of internal combustion engines comprising 1) an evaporator pipe which consists of a cylindrical recess in the interior of the catalytic converter for the partial oxidation of liquid fuel,
2) a liquid fuel feed and an exhaust gas feed separately connected to the cylindrical recess, and
3) the heat reaction of the partial oxidation of the liquid fuel in the catalytic converter being transported to the cylindrical recess, the converter being designed as a honeycomb element, said process resulting in a homogeneous distribution of fuel in the exhaust gas during the partial oxidation.

* * * * *

UNITED STATES PATENT AND TRADEMARK OFFICE
CERTIFICATE OF CORRECTION

| | | |
|---|---|---|
| PATENT NO. | : 7,263,822 B2 | Page 1 of 1 |
| APPLICATION NO. | : 10/021346 | |
| DATED | : September 4, 2007 | |
| INVENTOR(S) | : Bender et al. | |

It is certified that error appears in the above-identified patent and that said Letters Patent is hereby corrected as shown below:

On the Title of the Patent Item [57] in the first line of the Abstract:
"of furl for" should read --of fuel for--

In Claim 5, col. 8, indicated line 47:
"$\gamma$-AI$_2$O$_3$" should read --$\gamma$-Al$_2$O$_3$--

In Claim 14, col. 10, indicated line 3:
"$\gamma$-AI$_2$O$_3$" should read --$\gamma$-Al$_2$O$_3$--

Signed and Sealed this

Eighteenth Day of March, 2008

JON W. DUDAS
*Director of the United States Patent and Trademark Office*